June 20, 1939. R. ANSCHÜTZ 2,162,691
COMPUTING MECHANISM
Filed Sept. 22, 1931 8 Sheets-Sheet 1

Fig. 1

June 20, 1939.    R. ANSCHÜTZ    2,162,691
COMPUTING MECHANISM
Filed Sept. 22, 1931    8 Sheets-Sheet 3

June 20, 1939.　　　R. ANSCHÜTZ　　　2,162,691
COMPUTING MECHANISM
Filed Sept. 22, 1931　　8 Sheets-Sheet 4

June 20, 1939. R. ANSCHÜTZ 2,162,691
COMPUTING MECHANISM
Filed Sept. 22, 1931    8 Sheets-Sheet 5

R. Anschütz
INVENTOR

By Marks & Clerk
Attys.

June 20, 1939.    R. ANSCHÜTZ    2,162,691
COMPUTING MECHANISM
Filed Sept. 22, 1931    8 Sheets-Sheet 6

R. Anschutz
INVENTOR

By: Marks & Clerk
Att...

June 20, 1939.  R. ANSCHÜTZ  2,162,691
COMPUTING MECHANISM
Filed Sept. 22, 1931   8 Sheets-Sheet 7

R. Anschütz
INVENTOR

By: Marks & Clark
ATTYS.

Patented June 20, 1939

2,162,691

UNITED STATES PATENT OFFICE 2,162,691

COMPUTING MECHANISM

Robert Anschütz, Zella-Mehlis, Thuringia, Germany, assignor to Mercedes Buromaschinen-Werke Aktiengesellschaft, Benshausen, Germany Application September 22, 1931, Serial No. 564,453
In Germany November 6, 1930

5 Claims. (Cl. 235—59)

This invention relates to totalizing-counter mechanisms for typewriting-calculating machines.

It has hitherto been proposed in calculating machines in which subtraction is performed by adding the complement of the subtrahend, to provide a device in conjunction with the lever which sets the machine for subtraction, for moving the units wheel forward one step to introduce the "1" which, as is known in this method is necessary to be added to obtain the correct difference of the numbers being subtracted.

In calculations involving serial numbers of articles, in the known types of typewriting-calculating machines, difficulties are presented and may easily lead to a result, which is one less than the correct result. This is the case, for instance, if from the number of admission tickets disposed of, the number of sold admission tickets is to be determined. If the last admission ticket sold, bears the number 700 and the ticket first disposed of bears the number 350, in calculating the number of tickets sold, by subtracting those numbers in a totalizer, the result indicated on the numeral wheels is 350. The number of tickets actually disposed of, however, is not 350 but 351.

In adding machines, devices are already known for avoiding this source of error but in these machines, the usual tens transfer mechanism is used for introducing the "1" which is lacking by presetting the machine, whereby the total (i. e. the difference) when taken will be larger by one unit. This arrangement, however, does not lend itself to application in typewriting-calculating machines, as in these machines, the tens transfer is effected when the number wheels of the operating denomination pass from "0" to "9" or from "9" to "0" and by mechanism acting in dependence upon these wheels on the wheels of the next higher denomination.

These difficulties are obviated, according to the invention, by providing in conjunction with a totalizing-counter mechanism, a manipulation device independent of the manipulative members used in addition and subtraction, and adapted after the termination of a calculation by the machine, to operate the totalizing-counter mechanism so as to introduce an additional amount thereinto in one direction only.

It is already known in connection with typewriting-calculating machines having totalizers for registering both positive and negative totals, to provide devices for introducing additional amounts independently of the machine calculating operation, but such devices are inapplicable to the present purpose as they operate in both directions and also withdraw amounts which have already been registered.

In the drawings, examples of arrangements in conjunction with the known Mercedes-Addelektra typewriting-calculating machine are illustrated.

The description of the invention proper will be preceded by a brief explanation of the operation of the Mercedes-Addelektra typewriting-calculating machine.

Figure 1:
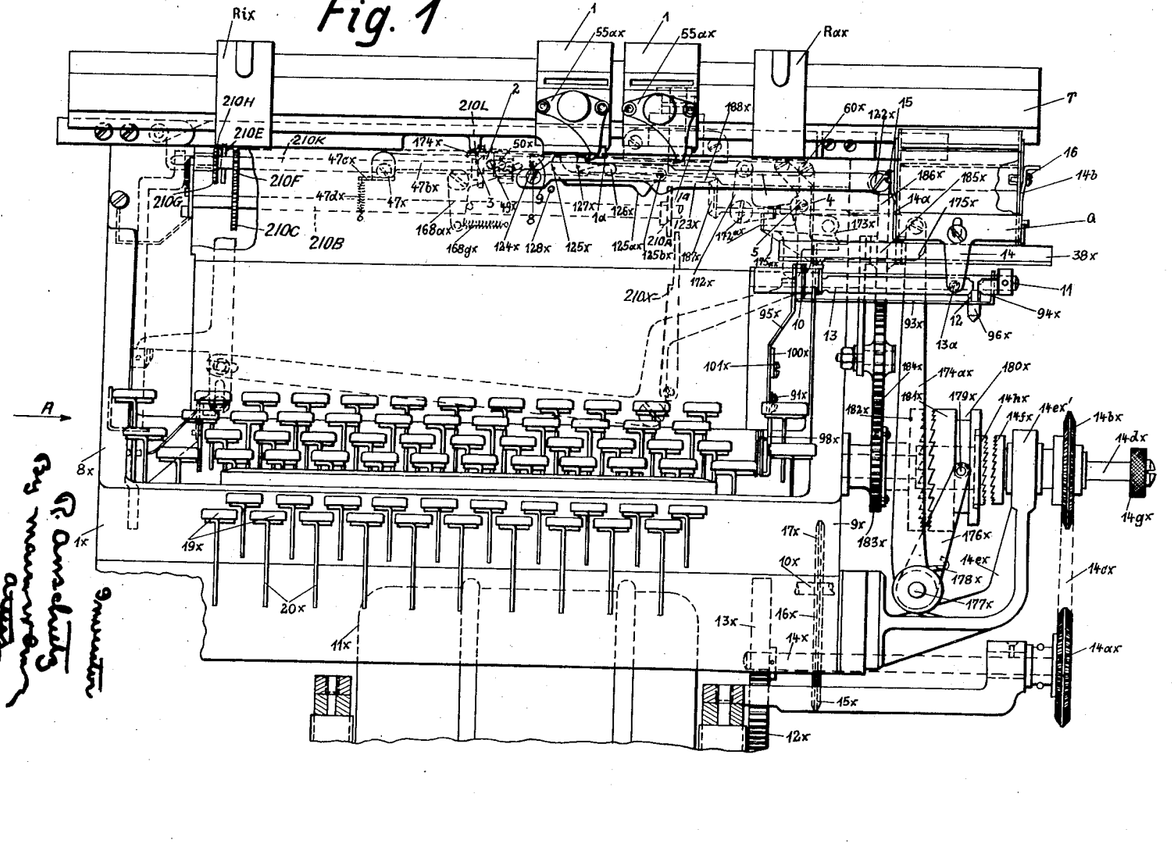
Fig. 1 is a front view of a power driven typewriter calculating machine having a cross footer.
Figures 1A, 2:
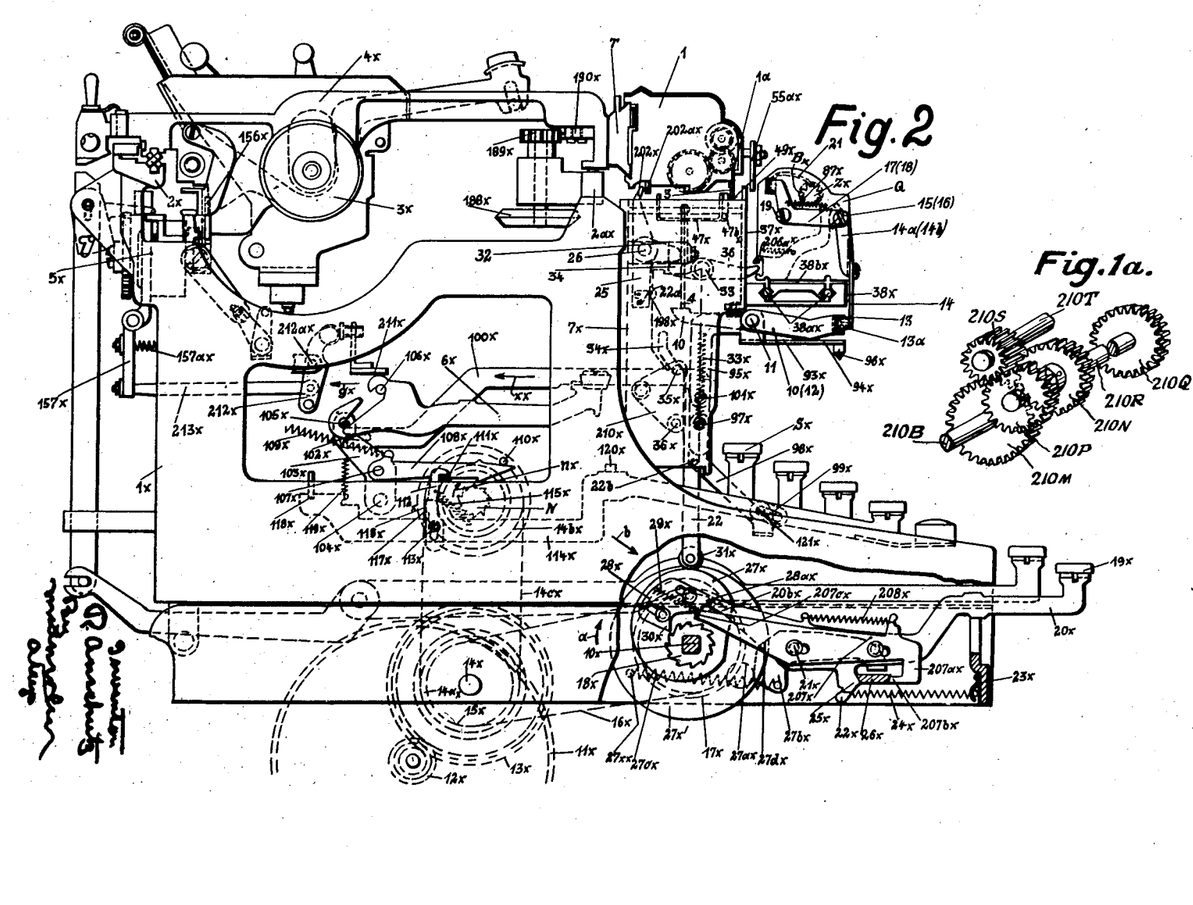
Figure 1a shows a perspective view of the reversing gear for the cross-footer.
Fig. 2 is a side elevation of Figure 1 viewed in the direction of the arrow A.

$1x$ is the frame of the typewriter calculating machine and the carriage $4x$ carrying the platen $3x$ is slidably arranged on the rails $2x$ and $2ax$ (Fig. 2). By means of the carriage pulling spring (not shown), the carriage $4x$ is urged constantly (Fig. 1) from right to left and when striking a type lever $6x$ against the platen $3x$, the carriage $4x$ is moved one step to the left by the escapement $5x$ completely shown in Figure 3.

There is provided at the front of the typewriter the rear wall $7x$ of the actuator which carries all the counting mechanisms while the driving shaft $10x$ for operating the actuator is mounted in the two side walls $8x$ and $9x$ (Fig. 1) of the frame $1x$. The said driving shaft $10x$ is constantly rotated in the direction of the arrow $a$ by the constantly running motor $11x$ over the toothed wheels $12x$ and $13x$, the shaft $14x$, a sprocket wheel $15x$ secured thereto, the chain $16x$ and the sprocket wheel $17x$ arranged on the shaft $10x$ itself.

The ratchet wheel $18x$ is fixed to the shaft $10x$ and rotates therewith. Such ratchet wheel $18x$ is provided for each of the ten calculating keys. The calculating key levers $20x$ are pivotally mounted at $21x$ on the machine frame and are normally maintained in their position (Fig. 2) by the springs $24x$ engaging on the one hand the hook $22x$ of the lever $20x$ and on the other hand the stationary hook $23x$. The abutment or stop $26x$ contacting the lug $25x$ limits the pivoting action in one direction. If the key $19x$ is depressed, the lever $20x$, being rocked on its pivot $21x$ clockwise, will release with its rearwardly extending member, the pawl $28x$ which is slidably arranged on the cam disk $27x$ loosely mounted on the shaft $10x$. The said pawl $28x$ therefore moves in the direction of the arrow $b$ under the action of the compression spring $29x$ acting on the pawl and the lug $30x$ upon said pawl engages the constantly rotating ratchet wheel $18x$.

Obviously, the cam disk $27x$ corresponding to the depressed key will thereby be coupled with the ratchet wheel $18x$ and the shaft $10x$ respectively for a single revolution. Consequently, the counting slide $22$, which comes in contact with the cam disk $27x$ by means of a roller $31x$ moves downwardly first under the action of its engaging spring $33x$ and then upwards again by the rotation of the cam $27x$. The slot $34x$ of the counting slide $22$ corresponding to the value of the depressed key acts on the rod $35x$ of a rocking frame secured to the rotatably mounted shaft $36x$ whereby the shaft $36x$ is turned in conformity with the depressed value. There is mounted on the axis $36x$ the well known single-way segment, $210x$ (Fig. 1) which transmits the rocking movement of the rocking frame to the toothed wheel $210A$ of the shaft $210B$. The shaft $210B$ has mounted upon it the toothed wheel $210C$ which is axially movable on the shaft but not rotatable thereon. The wheel $210C$ can be moved into three different positions by means of a lever (not shown). If the wheel $210C$ is in the position shown in Fig. 1 the rotary movement of the shaft $210B$ is transmitted through the wheels $210F$ and $210G$, which are in fixed relation to one another, to the wheel $210H$, which is arranged in rear of the wheel $210G$. The wheel $210H$ is secured to the shaft $210K$, to which is also secured the main driving wheel $210L$ which enters the corresponding amount additively in the totalizers $1$.

It may be mentioned at this point that the wheels $210G$, $210F$, $210H$ and $210E$ all have the same number of teeth.

If, however, the wheel $210C$ is in its middle position, that is to say, if the wheel $210C$ assumes the position between the wheel $210F$ and the wheel $210E$, no transmission of the rotary movement of the shaft $210B$ to the shaft $210K$ takes place. If now the wheel $210C$ is in engagement with the wheel $210E$ (Fig. 1), a transmission of the rotary movement of the shaft $210B$ to the shaft $210K$ takes place, in which case the corresponding amount is entered subtractively in the totalizer $1$.

A similar reversing gear is provided for the cross-footer Q. If the wheel $210M$ (Fig. 1a) which is displaceably but non-rotatably fixed upon the shaft $210B$ is in a position as illustrated in Fig. 1a the rotary movement of the shaft $210B$ is transmitted through the wheel $210N$, which is fixed upon the shaft $210R$, to the shaft $210R$. On the shaft $210R$ is secured the main driving wheel $210Q$ which enters the corresponding amount additively in the cross-footer Q. If the wheel $210M$ is in its middle position, in which position the wheel $210M$ is situated between the wheel $210N$ and the wheel $210S$, a transmission of the corresponding amount to the cross-footer Q cannot take place. The wheel $210S$ is wider than the wheel $210P$. If, however, the wheel $210M$ is in engagement with the wheel $210S$ a transmission of the rotary movement of the shaft $210B$ to the shaft $210R$ takes place through the intermediary of the wheel $210P$ which is likewise fixed upon the shaft $210R$. Consequently the corresponding amount is transmitted subtractively to the cross-footer Q. At this point it should be mentioned that the wheels $210N$ and $210P$ have the same number of teeth.

In order to maintain the cam disk $27x$ in its normal position shown in Figure 2, the same is secured to a disk $27x'$ on which is rotatably mounted a roller $27ax$ on the opposite side to the cam $27x$. The said roller cooperates with a lever $27bx$ which is also pivoted at $21x$ and is always kept in contact with the roller $27ax$ by a spring $27cx$ secured to the lever and also at $27xx$ on the machine frame. Since the end of the lever $27bx$ away from the roller $27ax$ does not bear against the member $26x$, the cam disk $27x$ will always be urged in the direction of the arrow $a$ by the spring $27cx$, acting through the lever $27bx$, the roller $27ax$ and the disk $27x'$, while the rotation of the cam disk $27x$ is prevented by the lug $28ax$ of the pawl $28x$ coming in contact against the key lever end $20bx$ of the lever $20x$ and consequently the cam disk $27x$ is maintained in its normal position.

Figure 4:
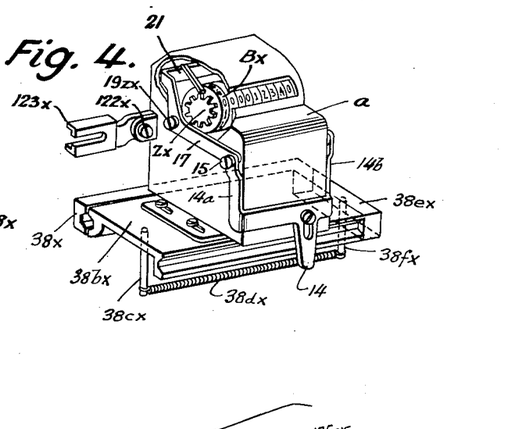
Fig. 4 shows in perspective the cross footer carriage with the cross footer secured thereto, a part of the cross footer being shown broken away for uncovering some sections, whereby for the sake of clearness the parts according to the invention are removed. This is also true with regard to the cross footer, shown in Fig. 1.

There is secured to the front wall 37x (Fig. 2) of the machine frame 1x, covering the calculating mechanism, a bracket 38x wherein by means of balls 38ax a carriage 38bx (Fig. 4) is slidably mounted on which the cross footer Q is secured. There is secured to the carriage 38bx a pin 38cx with which a spring 38dx engages. The spring 38dx is fastened at its other end by a pin 38fx secured to the cross piece 38ex of the bracket 38x. By means of the spring 38dx the carriage 38bx is pulled against the cross piece 38ex of the bracket 38x whereby its normal position, as shown in Figs. 1 and 4 is established.

There is connected to the cross footer Q a controlling mechanism for the clearance sign printing means, which will now be fully described.

The two armed lever 47x is adapted to rotate on the axle 48x mounted in the machine frame. A spring 47dx engages with the lug or flap 47cx of the lever 47x and maintains the lever 47x in connection with hereinafter described members in the normal position shown in Figure 5. A pin 49x is riveted to the free end of the lever 47bx and extends through slots 50x of the lever 3.

There is formed on the said lever 3 (Figs. 5 and 13) a projection or lug 2 which cooperates with the cams 1a (Fig. 1) of the totalizers 1 mounted on a rail T (Figs. 1 and 2). A triangular groove 9 having a bevel edge 9a (Fig. 5) is also provided in the lever 3, a pin 8 secured to the machine frame 1x extending into the said recess. The lever 3 is secured by means of the screw 60x to the lever 4. It is obvious from Figures 5 and 13 that by means of the triangular groove and the pin 8 as well as the elements 50x, 49x, 47x and the spring 47dx, the lever 3 is maintained in its horizontal normal position, shown in Figures 1, 5 and 13.

The lever 4 is connected at 5 to the machine frame and is actuated clockwise by a tension spring 6 (Figs. 5 and 13) fastened to the pin 7, the normal position of the lever 4 being maintained by means of the connection of the triangular groove with the pin 8. The lever 10 (Figs. 1, 2, 5 and 13) is adapted to pivot freely on an axle 11 below the bracket 38x and cooperates with the lever 4.

By means of a U-rail 13, the lever 10 is connected at its forwardly extending free end (Figs. 1, 2 and 13) to a lever 12 rotatably mounted on the axle 11.

By means of the roller 13a (Figs. 1, 2 and 13) the said U-rail 13 is slidably connected to the slide 14 adapted to move vertically on the wall of the cross footer Q. The slide 14 has two upwardly extending members 14a and 14b, which are connected by means of the screws 15 and 16 to the members 17 and 18 (Figs. 2, 4 and 13) of the rake-like rail 21, actuated by a spring 87x (Fig. 2). The rail 21 is adapted to pivot on the screws 19 on the side walls of the cross footer Q and cooperates with the numeral gears Zx (Figs. 1 and 4) which have in the known manner a shortened tooth on the part corresponding to the zero position of the totalizer wheels Bx (Fig. 4).

In Fig. 4 the totalizer wheels Bx are shown close together for the sake of simplicity while there is actually a space between all of them for the toothed wheels Zx secured to them, and consequently an engagement of the rail 21 between the numeral rollers Bx is also possible.

Figure 6:
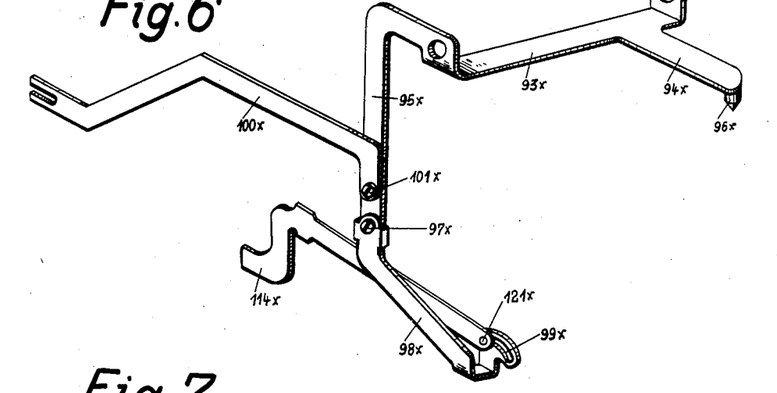
Fig. 6 shows in perspective the clearance sign printing means.

A two-armed lever comprising the bridge 93x (Figs. 1, 2 and 6) and the arms 94x and 95x is also rotatably mounted on the axle 11. The arm 94x is provided with a knob 96x and the arm 94x may be actuated by the lever 12 (Figs. 1 and 2) of the U-rail 13. Regarding the function of the knob 96x, as will be understood the clear sign is printed only when the cross-totalizer Q stands at zero. If any number wheels Zx are out of zero position and the feeler rake 21 released by lever 4 said rake can only swing out to the extent permitted by the teeth of said wheels and the lever 98x operating the clear sign 114x will only be swung slightly. The slot 99x in the lever 114x is shaped so that such swinging of lever 98x does not effect printing of the clear sign. However, such slight swinging of lever 98x renders locking mechanism effective to prevent the introduction of values in the cross-totalizer Q. To correct the situation the locking means must be rendered ineffective and this is accomplished by manipulation of knob 96x to force lever 93x upward whereby the feeler rake is returned to normal position, the springs 87x tensioned and the locking mechanism rendered ineffective by the lever 4. By means of the screw 97x, a lever 98x is secured to the downwardly extending arm 95x (Fig. 1), the lower end of the said lever 98x being provided with a cam slot 99x. The lever 108x is pivotally connected to the lever 95x by means of the screw 101x, the other end being bifurcated and enclosing a pin 102x (Fig. 2) which is secured in the intermediate lever 103x (Fig. 2) of a type lever. The intermediate lever 103x is adapted to rock on the axis 104x and is connected by its pin 105x to a type lever 6x, rotatably mounted on an axis 106x and carrying the clearance sign printing type.

A pulling hook 108x (Fig. 2) is connected to the intermediate lever 103x by a pin 107x and is constantly urged by a tension spring 109x about its pin 107x counter-clockwise and abuts against an abutment 110x, whereby its normal position is maintained. There is formed on the pulling hook 108x a lug or projection 111x which cooperates with a pawl 112x. This pawl 112x is mounted by means of a pin 113x on the key lever 114x and is urged by a tension spring 115x in such a manner that it bears with its lug 116x against a projection 117x upon the key lever 114x. The key lever 114x pivots at 118x and is maintained in its normal position by a spring 119x and an abutment 120x.

Figure 7:
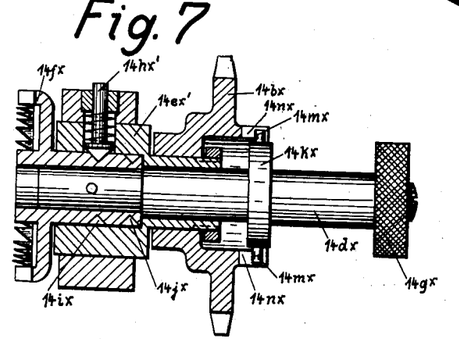
Fig. 7 shows the driving and coupling means for the power operated cam shaft N of the typewriting mechanism partly in elevation and partly in section.

The lever 114x, by means of which the clearance sign type lever 6x is struck, is not provided with a key but has a pin 121x which engages in the cam slot 99x formed in the lever 98x. There is arranged below the pulling hook 108x the ratchet shaft N which is driven from the driving shaft 14x (Fig. 1) by a sprocket wheel 14ax (Figs. 1 and 2) fixed thereon and a chain 14cx driving a sprocket wheel 14bx. The sprocket wheel 14bx is rotatably but not slidably mounted on the stationary part 14ex' of bearing 14ex. The spindle 14dx which is rotatably and slidably mounted in the part 14ex' (Fig. 7) carries on its left end the clutch portion 14fx and on its right end the knob 14gx which is rotatably arranged but not displaceable axially. In the hollow hub of the sprocket wheel 14bx, a collar 14kx is fixed to the spindle 14dx, carrying two pins 14mx which protrude through slots 14nx on the hub of the sprocket wheel 14bx, whereby rotation is transmitted from the sprocket wheel 14bx to the spindle 14dx. The slots 14nx are of such length that when the knob 14gx is pushed to the left, the clutch portion 14fx is allowed to engage with the clutch portion 14hx (Fig. 1) secured to one end of the ratchet shaft N, whereby the shaft N rotates in the direction of the arrow indicated in Fig. 2. The spindle 14dx is locked in clutched and unclutched positions by a spring pin 14hx', which is adapted to engage in corresponding notches 14ix and 14jx.

The totalizers 1 are provided with cams 55ax (Fig. 1) extending into the path of a pick-up mechanism, which is secured by means of the screw 122x (Figs. 1 and 4) to the cross footer Q. The pick-up mechanism which substantially comprises a rod 123x (Figs. 1 and 8) extends at the other end through the medium of a screw 124x (Figs. 8 and 5) into a horizontal slot (not shown) of the front wall of the calculating or actuator mechanism.

Figure 8:
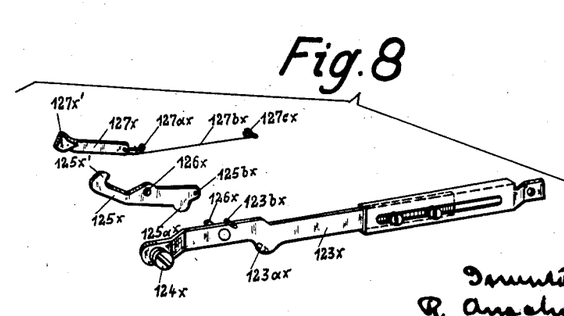
Fig. 8 shows in perspective the pick-up means for the cross-footer, some parts being shown separately for the sake of clearness.

The hook 125x is pivotally mounted by means of a pin 126x on the rod 123x of the pick-up mechanism (Figs. 1 and 8). At the point 125bx of the hook 125x, the hook 127x is pivotally mounted, on the end 127ax of which a wire spring 127bx acts. The spring is secured at 127cx to the rod 123x. In this manner, both hook 125x and hook 127x are maintained in their normal position, as shown in Fig. 1. The normal position of the hook 127x is thus established by the latter bearing on the pin 123bx. It is obvious that owing to the greater distance of the point of connection of the hook 125x from the engaging point of the spring 127bx, the left end of the hook 125x is subjected to a greater spring action than the left end of the hook 127x. This has the advantage that during the left hand movement of the paper carriage 4x, the cams 55ax of the totalizers 1 are easily adapted to press the hook 127x downwardly, for which purpose the end 127x' of the hook 127x is also suitably shaped. If the cam 55ax of the respective totalizer has moved over the hook 127x it meets with resistance on the correspondingly shaped projection 125x' of the hook 125x, subjected to comparatively greater elasticity while at the same time the projection 127x' of the hook 127x is adapted to bear behind the cam 55ax of the totalizer 1. If the paper carriage 4x is now moved further to the left, it is obvious that the rod 123x will now be carried along and since the latter is secured at 122x to the cross footer Q which, in its turn is secured to the carriage 38bx (Fig. 4) this cross footer Q together with the carriage 38bx will also be carried along against the action of the spring 38dx. If during this left hand movement, the hook 125x bears with its part 125ax on the pin 128x (Fig. 1) fixed to the machine frame, the hook 125x will be swung in the anti-clockwise direction about the pin 126x whereby it is released from the cam 55ax of the corresponding totalizer 1 so that the cross footer Q together with the pick-up mechanism and the slide 38bx can return to their normal position on the right under the action of the spring 38dx.

Figure 3:
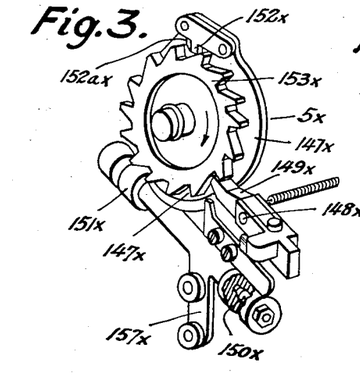
Fig. 3 shows in perspective the escapement mechanism with fixed and stepping dog therefor.
Figure 9:
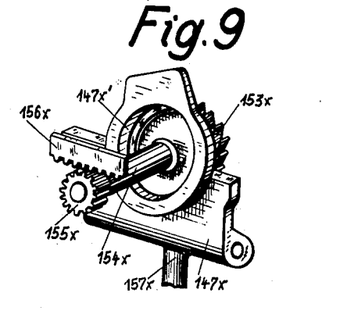
Fig. 9 shows in perspective parts of the carriage escapement mechanism, shown in Figure 3 but seen in the direction opposite to that in Figure 3.
Figure 10:
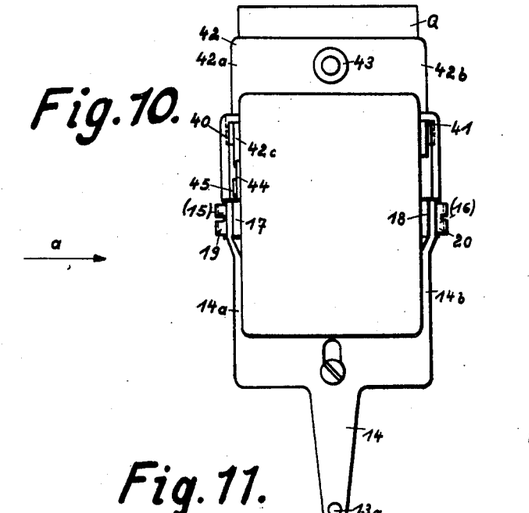
Fig. 10 shows a front view of the usual cross totalizer with the arrangement according to the invention.

There is rotatably mounted between the two center-points 150x and 151x (only one center-point is shown in Figure 3) the dog rocker 147x which carries the stepping dog 149x as well as the fixed dog 152x. The latter is provided with an inclined surface or bevel 152ax on which the teeth of the escapement wheel 153x are adapted to act. The escapement wheel 153x (Fig. 9) is secured to the shaft 154x rotatably mounted in the machine frame and is driven by a rack 156x secured to the paper carriage 4x in any suitable manner (for instance, by screws) the said rack engaging in a toothed wheel 155x which is also secured to the shaft 154x. Since the shaft 154x extends through the dog rocker 147x, a hole 147x' (Fig. 9) is provided therein which is large enough so as not to prevent a free swinging out of the dog rocker 147x. The arm 157x of the dog rocker 147x is oscillated from the moving type lever 6x as hereinafter fully described.

In the normal position, a tooth of the escapement wheel 153x lies on the stepping dog 149x, while the fixed dog 152x is out of engagement with the escapement wheel 153x. The briefly described carriage escapement shown in Fig. 3 is usually provided in the Mercedes typewriter of which there are many thousands on the market and is only described herein for the purpose of a better understanding of the invention.

Figure 5:
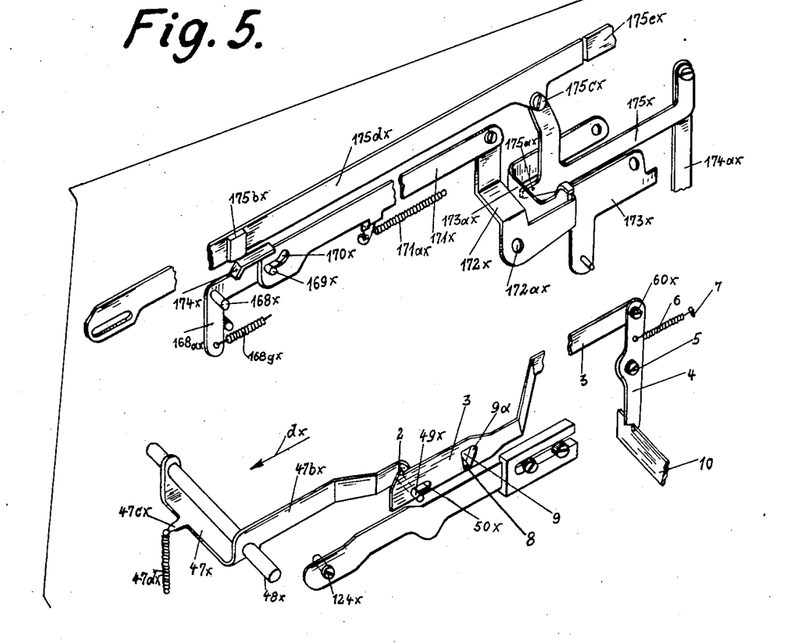
Fig. 5 is a perspective view partly broken away of the pick-up means for the cross footer, the controlling mechanism for the clearance sign printing means and the controlling mechanism for the carriage return means.

There is also provided a bell crank lever 168ax (Figs. 1 and 5) adapted to pivot on a spindle 168x, which lever is maintained in its normal position by a spring 168gx (Figs. 1 and 5). A pin 169x secured to the horizontal member of the bell crank lever 168ax engages in a slot 170x of a rod 171x, acting through the parts 172x and 173x on an automatic carriage return means, which will now be briefly described.

During the stepwise left hand movement of the carriage 4x (Fig. 1) the right margin adjusted Rax, provided thereon abuts against the lug 174x (Figs. 1 and 5) of the rod 171x and carries it to the left against the action of the spring 171ax. In this manner, the bell crank lever 172x is pivoted about point 172ax counter-clockwise so that the U-shaped yoke or stirrup 173x is raised and thus releases the lever 175x, the lever 175x connected to the lever 174ax (Fig. 1) bearing with its projection 175ax against the cross piece 173ax (Fig. 5) of the yoke 173x. Consequently, the lever 174ax secured with the lever 175x (Fig. 1) on the common rotatably mounted spindle 177x may then rock under the action of a torsional spring 178x counter-clockwise whereby the lever 176x is swung out in the same direction. The lever 176x engages with a pin 179x in an annular groove 180x of a constantly rotating clutch portion 181x and shifts the same (shown in Fig. 1) to the left so that its teeth enter into engagement with the clutch portion 182x, thereby rotating the wheel 183x, secured thereto. The wheel 183x drives the wheel 189x (Fig. 2) through means of the wheel gears 184x (Fig. 1) 185x, 186x, 187x and 188x (Fig. 2).

Since the wheel 189x engages with the rack 190x, the carriage will therefore be brought back to its right end position. Shortly before the termination of the return movement of the carriage, the left margin adjuster Rix (Fig. 1) moves against an abutment or stop 175bx (Fig. 5) of the rod 175dx slidably mounted on the machine frame and connected at 175cx to the lever 175x whereby the rod 175dx (which was also previously moved to the left by the lever 175x) is again moved to the right against an abutment or stop 175ex on the frame while the lever 175x is also moved to the right and consequently the member 173x with its cross piece 173ax can again drop in front of the projection 175ax of the lever 175x. During the movement of the lever 175x on the right, the lever 174ax was of course also rocked clockwise whereby the clutch 181x and 182x over the parts 177x (Fig. 1), 176x and 179x is again opened and the return movement of the carriage interrupted.

The levers 25 and 25a carrying the locking beam 23 (Figs. 2 and 13) are secured to the rotatably mounted shaft 26. Now if the counting slide 22 during the downward movement acts with its bevel 22a on the locking beam 23, the shaft 26 will rock clockwise, whereby the unlocking lever 202x connected to the shaft 26 acts on the corresponding locking lever 202ax arranged in the totalizers 1. The purpose of the locking levers 202ax is known and is therefore not fully described herein since their operation is fully described in U. S. Patent 1,270,471 on page 9 wherein they are referred to as "swinging arms". The spindle 26 also carries a lever 32 which cooperates with a lever 34 mounted on a spindle 33. When the shaft 26 turns, the lever 32 rocks clockwise and effects by means of the lever 34 a turning of the shaft 33 and a counterclockwise rocking of the unlocking lever 36 secured to said shaft 33 and causes the unlocking of the cross footer Q.

The lever 36 has the same function as the lever 202x since it acts on the unlocking levers 206ax of the cross footer which are quite similar to the unlocking levers 202ax of the totalizers.

The operation of the above mechanism is as follows:

By depressing a calculating key 19x (Fig. 2) the key lever 20x is rocked about 21x clockwise, whereby the end 20bx of the key lever 20x is rendered inoperative relatively to the projection 28ax formed on the latch 28x and consequently releases the latch 28x. This latch 28x is now shifted by the spring 29x in the direction of the arrow b to such an extent that its projection 30x engages with the constantly rotating toothed wheel 18x and thereby couples the cam disk 27x with the same so that the cam disk participates in the rotation. At the same time, the hook-shaped extension 207ax of the lever 207x slides down under the tension of the spring 208x on the front surface of the rail 26x until the extension 207ax with its terminal 207bx engages under the rail 26x at the last moment of the downward movement of the key lever 20x whereby the latter is maintained in its depressed position.

When the cam disk 27x begins to rotate, the roller 27ax arranged thereon comes out of contact with the lever 27bx whereby the latter becomes free and rocks under the tension of the spring 27cx clockwise until its one end bears against the rail 26x. Prior to the completion of a revolution, the roller 27ax comes in contact with the other end (in the form of a cam) of the lever 27bx and rocks the same on its pivot 21x counter-clockwise against the action of the spring 27cx engaging therewith until the roller 27ax goes beyond the dead center 27dx. From this moment, the lever 27bx exerts a driving action on the roller 27ax and on the cam disk 27x, whereby a rotatory motion independent of the shaft 18x is imparted to the cam disk 27x and simultaneously effects a lead of the cam disk relative to the shaft 18x and the toothed wheel 18x respectively, thereby facilitating the uncoupling of the pawl 30x from the ratchet wheel 18x.

At the same time, the projection 28ax of the latch 28x comes in contact with the projection 207cx of the lever 207x when the lever 20x is depressed in its path of rotation whereby the latch 28x comes out of engagement with the toothed wheel 18x. In this manner, the lever 207x abutting the latch 28x is brought against the action of the spring 208x into the position (shown in Fig. 2) relatively to the key lever 20x while when depressing the key 19x the projection 207ax passing under the rail 26x becomes free so that the key lever mechanism can also be returned by the key lever spring 24x to the position shown in Fig. 2. When the key lever 20x rocks in its normal position, the projection 207cx of the lever 207x comes out of contact with the projection 28ax of the latch 28x so that the cam disk 27x can rotate further under the action of the spring 27cx until when the projection 28ax comes in contact with the end 20bx of the key lever 20x in its operative position when a further rotation is prevented. The individual parts of the mechanism again assume their initial position as shown in Figure 2.

If when depressing a calculating key 19x the cam disk 27x participates in the rotation of the driving shaft 18x and consequently the corresponding counting slide 22 moves downward, the cam slot 34x thereof acts on the spindle 35x whereby the frame 210x and consequently the spindle 36x is rocked counter-clockwise in accordance with the value of the depressed key. The rocking movement corresponding to the value of the depressed key is effected by the different inclination of the slots 34x of the various counting slides 22. For the purpose of transmitting this rocking movement to the counters there is secured, as already stated, to the spindle 36x a segment (not shown) which brings the value corresponding to the depressed key 19x into the totalizer which is just in operative position and into the cross footer. After a complete transmission of the value i. e. prior to the completion of the downward movement of the counting slide 22, the pin 22b arranged on the latter acts on the corresponding numeral writing key levers which are similar in shape to the clearance sign printing key lever 114x except that they are provided with keys Sx. It is obvious that parts similar to the parts 112x, 108x, 103x and 6x are also coordinated to each of the said numeral writing key levers. However, none of the counting slide pins 22b act on the clearance sign printing key lever 114x. It is therefore obvious that when the pin 22b acts on the corresponding writing key lever, the corresponding type lever will strike against the platen 3x whereby the calculated value is printed. In this manner, the type acts on the universal bar 211x and moves it in the direction of the arrow gx. The lever 212x is thereby rocked on its fixed pivot 212ax counter-clockwise and consequently the rod 213x is drawn in the opposite direction of the arrow gx whereby the dog rocker 147x is rocked by the arm 157x (Fig. 3) about the center points 150x and 151x against the action of the compression spring 157ax (Fig. 2). In this manner, the stepping dog 149x (Fig. 3) becomes disengaged from the escapement wheel 153x and the fixed dog 152x becomes engaged therewith, the loose ratchet tooth 149x swinging upwards about the spindle 148x under the action of a spring.

When the type lever 6x (Fig. 2) has struck the platen 3x, the tension spring 109x engaging with the pulling hook 108x returns the type lever 6x to its normal position whereby the dog rocker 147x also returns to its normal position under the action of the compression spring 157ax. The carriage pulling spring then acts on the paper carriage 4x and the rack 156x (Fig. 9) secured thereto, which drives the escapement wheel 153x by means of the wheel 155x and the spindle 154x in the direction of the arrow indicated in Fig. 3 while the stepping dog 149x which has meanwhile returned with the dog rocker 147x to the normal position engages in the next tooth-space of the escapement wheel 153x so that the paper carriage 4x is advanced one step for printing the next letter.

During this stepwise movement of the carriage from right to left, the cam 55ax (Fig. 1) of the totalizer I which is in operative position has operative connection with the hook 125x of the cam operated mechanism 123x whereby the cross footer Q is carried by the carriage 4x until the respective totalizer again moves out of the operative position, which takes place in the following manner.

When writing the value which is in the units position of the cross footer Q the pin 128x (Fig. 1) arranged on the machine frame 1x acts in consequence of the movement of the carriage on the projection 125ax of the pick-up hook 125x and swings the latter in the anti-clockwise direction about the point 126x whereby the pick-up mechanism 123x and the cross footer Q is released from the cam 55ax and can return to its normal position shown in Figure 1. By the movement of the carriage which is caused when writing from the units position, the projection 1a of the totalizer 1 also acts on the projection 2 of the lever 3 and draws the latter to the left, whereby the lever 4 releases the lever 10 so that the springs 87x (Fig. 2) can act on the rake like contacting rail 21. The latter cooperates with the driving wheels Zx of the totalizer wheels Bx (Figs. 2 and 4) wherein, as stated, that tooth is shortened which in the zero position of the totalizer wheels Bx lies opposite the rail 21. This swinging out of the rail 21 is therefore only possible when the shortened teeth of all wheels Zx are opposite thereto i. e. only when all totalizer wheels Bx are at zero.

If in the writing out of the value, the cross footer Q comes to zero, the springs 87x are adapted to completely swing the member 21 clockwise. Consequently, the slides 14a and 14b move downward and swing the yoke on the axis 11 clockwise (Fig. 2) the said yoke comprising the U-rail 13 and the levers 10 and 12. In this manner, the lever 12 acts on the arm 94x of the lever 93x, 95x, and 98x and also rocks the same clockwise so that the cam slot 99x of the lever 98x acts on the lever 114x and presses it downward against the action of its spring 119x whereupon the pawl 112x positively connected to the key lever 114x causes the pulling hook 108x to engage with the cam shaft N constantly rotating in the direction of the arrow nx. The intermediate lever 103x is thereby swung out on the axis 104x clockwise and thus effects the striking of the type lever 6x bearing the clearance sign against the platen 3x whereby the clearance sign is printed.

During this operation, however, the rod 100x, which is connected to the lever 95x, has also been moved in the direction of the arrow xx (Fig. 2) to such an extent that the bifurcated end of the rod is moved into engagement with the pin 102x on the intermediate lever 103x. As this lever is operated by the pulling hook 108x the pin 102x will move the rod 100x in the direction opposite to that shown by the arrow xx, whereby the member 21 is returned by means of the elements 95x, 93x, 94x, 12, 13, 14, 14a and 14b to its normal position shown in Figure 2, the springs 87x being again tensioned and the lever 4 again engaging over the lever 10.

When the rod 3 is drawn by the projection 1a of the totalizer 1 in the direction of the arrow dx Fig. 5, the projection 2 is released from the projection 1a of the totalizer 1 in consequence of the bevel or inclined surface 9a of the triangular groove 9 coming in contact with the pin 8, whereby the parts 3, 4 can return to their normal position under the action of the spring 6.

If the clearance sign has now been printed, the margin adjuster Rax will abut, during the further stepwise left movement of the carriage, against the lug 174x (Fig. 5) of the rod 171x, as already stated, whereby the return movement of the carriage will take place.

It is obvious from the above description that during a movement of the carriage from right to left the cross footer Q is automatically carried along, the clearance sign printing means is rendered operative and the return of the carriage takes place while a movement of the carriage from left to right does not render the said mechanisms operative since the cam hook 125x is merely forced downwardly by the hook 55ax, the lever 2 by the projection 1a and the lever 171x by the margin adjuster Rax without any effects being exerted.

Figures 13, 14:
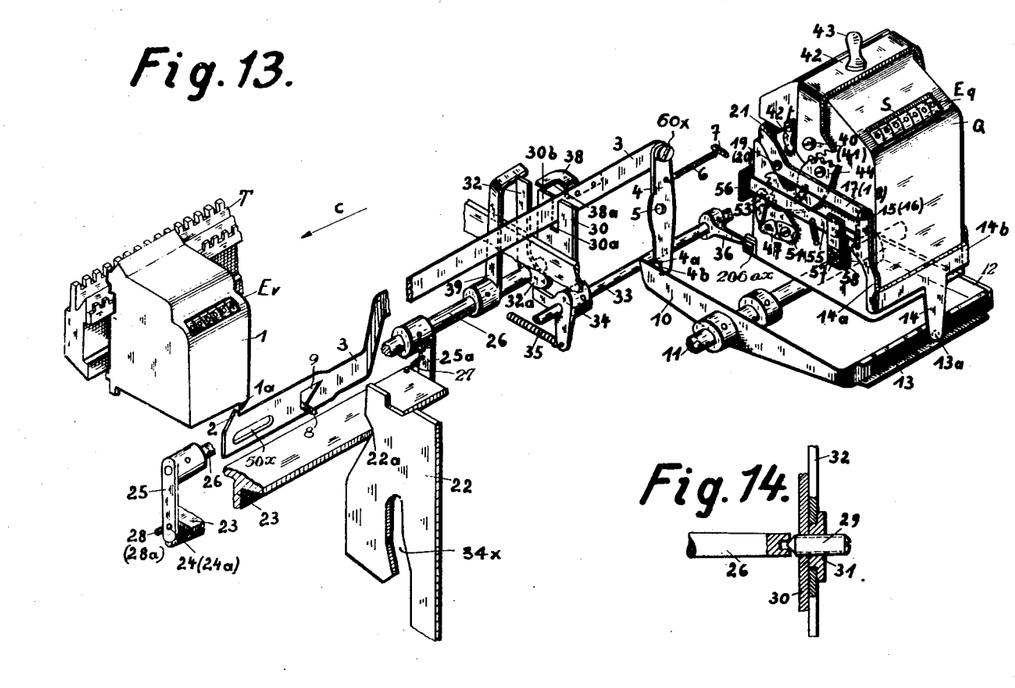
Fig. 13 shows in perspective view the locking mechanisms for the clear sign impression and differential members in conjunction with the arrangement according to the invention.
Fig. 14 shows a detail, partly in section, in Fig. 13.

If, on the contrary, the cross totalizer Q in the writing out of the value, does not come to zero, as already mentioned, the feeler rake 21 swings only partially in. This partial swinging, however, does not suffice to operate the clearance sign printing mechanism, and in this case, the lever 4 abuts with its edge 4ª against the right side of the lever 10 whereby a lock is made operative which prevents actuation of the differential members 22 through their downwardly acting springs, until the rail 13 is pressed upwardly by hand so that the lever 10 can be again engaged by the stop 4b of the lever 4. This lock acts as follows:

For all the differential members 22 a common angle rail 23 is arranged so as to be rotatably mounted on the pins 24, 24a (in Fig. 13, only the pin 24 is visible) on the levers 25, 25a, which are pinned on a shaft 26. The angle rail 23 is acted on in the clockwise direction by a spring 27 and under the action of this spring, rests against the pins 28, 28a arranged on the machine frame (in Fig. 13, only the pin 28, is visible) whereby the rest position of the rail 23 is determined. The shaft 26 is rotatably mounted on the pointed screws 29 (Fig. 14) which are screwed into the side walls 30 (in Fig. 13 only the right hand side wall is shown) and are secured by means of nuts 31. The right-hand nut 31, according to Fig. 14, is reduced and on it a lever 32 is rotatably mounted. This acts with its lower end 32a on an angle lever 34 pinned to the shaft 33 and is acted on by means of a spring 35 in the clockwise direction. On the right-hand end of the shaft 33, moreover, is pinned the unlocking lever 36, which swings the locking lever 206ax of the cross totaliser Q in the unlocking sense. The upper end of the lever 32 can co-act with an angle member 38 fixed to the bar 3. If the bar 3 which, moreover, is guided in a slot 30a of the side wall 30 is in the position of rest represented in Fig. 13, the lever 32 can swing freely in the clockwise direction. If, however, the bar 3 moves in the direction of the arrow c, the angle member 38 fixed to it, places itself in the path of the lever 32 and prevents its swinging movement in the clockwise direction. Thereby, the edge 38a of the angle member 38 is in contact with the part 30b of the side wall 30. The lever 39, which is pinned on the shaft 26, acts on the lever 32.

If the bar 3 is in the rest position, as represented in Fig. 13, in the downward movement of a differential member 22, its edge 22a acts on the parts 25—23—25a which form a bail, and thereby swings the shaft 26 and the lever 39 in the clockwise direction. This then swings the lever 32 in the clockwise direction, which in turn, by means of the angle lever 34 and the shaft 33, rotates and consequently swings the unlocking lever 36 in the anti-clockwise direction, whereby the locking lever proper 37 is unlocked and thus the corresponding toothed wheel of the cross totaliser Q is freed for rotation.

If, however, the bar 3 is moved in the direction of the arrow c, the angle member 38 places itself in the path of the lever 32 so that the latter cannot swing clockwise. In consequence of this, the lever 39, the shaft 26, and the bail 25—23—25a, cannot swing clockwise, so that it is not possible for the differential members 22 to move downwards and any calculating operation is prevented, that is to say, the calculating mechanism is then locked and further calculation is impossible. In order to withdraw this lock, it is only necessary to lift the U-rail 13 whereby the lever 4 with its stop 4b snaps over the lever 19 again and as a consequence, the bar 3 can return to its rest position in which the angle member 38 again permits the lever 32 to swing freely in a clockwise direction.

On the housing of the cross totalizer Q a bail 42 is swingably mounted by means of screws 40 and 41 (Figs. 11 and 12) said bail being provided with a grip 43 serving as a handle for swinging the bail 42. The limb 42a of the bail 42, in contradistinction to the other limb 42b, is provided with teeth 42c, which are in continual engagement with the teeth of a toothed segment 44. The toothed segment 44 is swingably mounted on a screw 45, and the teeth 44a, formed on the lower part of the segment, engage with another toothed segment 46. This toothed segment 46 is loosely disposed on a shaft 47, which is rotatably mounted in the side wall of the cross totalizer.

Figure 11:
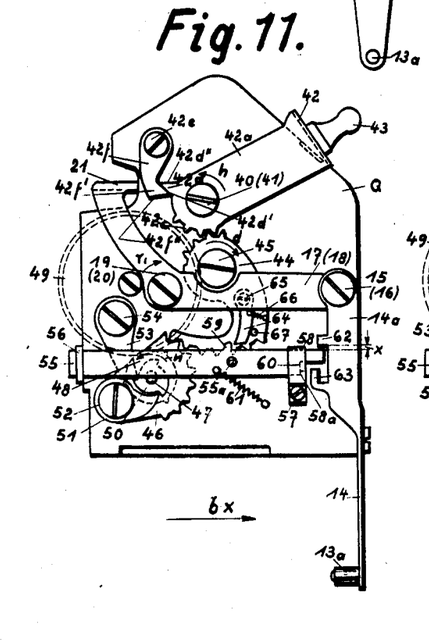
Fig. 11 shows a side view of the cross totalizer viewed in the direction of the arrow a, of Fig. 10, wherein the parts are represented in their rest position.
Figure 12:
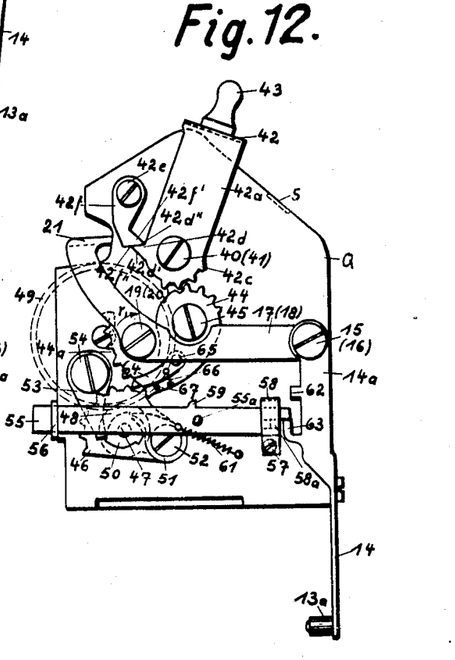
Fig. 12 shows a side view of the cross totalizer likewise viewed in the direction of the arrow, a, of Fig. 10, wherein the parts are represented in the position which they assume after operation resulting from unlocking of the clear sign impression device.

Further, the limb 42a of the bail 42 is provided with a nose 42d, which co-acts with a pawl 42f, swingably mounted on the screw 42e. By means of a torsion spring, not shown, positioned around the screw 42e, the pawl 42f is always acted on in the anti-clockwise direction. In the position represented in Fig. 11, the face 42d' of the nose 42d and the face 42f' of the pawl 42f co-act. If the bail 42 is swung in the direction of the arrow h, the face 42" of the nose 42d coacts with the face 42f" of the pawl 42f, and therefore holds the bail 42 in its position as represented in Fig. 12. The pawl 42f has thus the sole purpose of securing the bail 42 in both of its end positions.

On the inner side of the cross totalizer side wall, a three-toothed wheel 48, is fixed on the shaft 47, so as to be incapable of rotation thereon, and this wheel can engage with the driving wheel 49, which drives the number wheel in the units position Eq of the cross totalizer, but normally, it is out of engagement. Further, near the toothed segment 46, a cam 50, provided with three stops and fixed on the shaft 47, is arranged. With the stops, a pawl 51 can engage, the pawl being swingably mounted on the toothed segment 46 by means of a screw 52. A pawl 53 also engages with the stops of the cam 50 and by means of a screw 54 is swingably mounted on the side wall of the cross totalizer Q. Both of the pawls 51 and 53, are, by means of springs, not shown, maintained in engagement with the cam 50.

Figure 16:
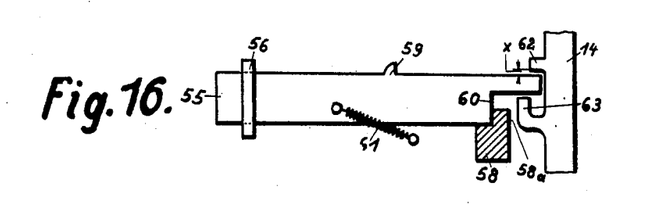
Figs. 16 to 19, show the individual settings of the members controlling the clear sign impression device of the new counting device.

Further, on the side wall of the cross totaliser Q, a slide 55 is arranged which is guided partly in a lug 56 bent on the rear end of the side wall of the cross totaliser Q and partly in an angle piece 58, fastened to the side wall by means of a screw 57. The slide 55 is provided with a nose 59 and has on its forward end a stop 60. By means of a spring, 61 engaging with the slide 55, the latter is always acted upon in the direction of the arrow bx, whereby its stop 60 rests against a stop 58a (Fig. 16) on the angle piece 58 and it is held in the rest position, as represented in Figs. 11 and 16. The forward end of the slide 55 projects into the path of a nose 62, which is formed on the clear sign bridge 14. Further, on the latter, a nose 63 is arranged which in relation to the nose 62 is displaced to the left. On the toothed segment 44, a pawl 64 is attached by means of a screw 65, so as to be capable of swinging thereon, and by means of a spring 66 is drawn always against a fixed stop 67. The pawl 64 co-acts in a manner to be later described, with the nose 59 of the slide 55.

The manner of operation is explained with the aid of the following example of calculation.

Let it be assumed that in an advance booking of admission tickets, so many tickets are sold at an advance booking office, that the reckoning up of such takes place at the principal office, and that the tickets Nos. "350" to "700" have been disposed of. In a similar manner, reports go in from all advance booking offices and from this data, the total number of tickets disposed of, is to be calculated. If these numbers were simply deducted from one another, the number of tickets disposed of would be too small by one ticket. It is consequently necessary to add a "1" to the real difference.

Figure 15:
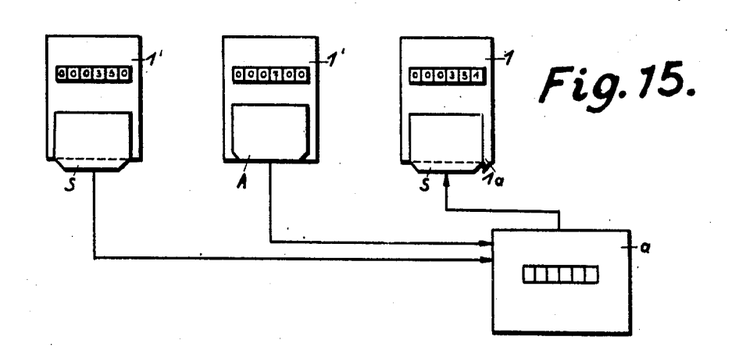
Fig. 15 shows in diagrammatic representation, the arrangement of the column totalizers and particularly the setting of their teeth which control the type of calculation in the cross totalizer, according to the example of calculation to be later described.

For carrying out this calculation, three vertical column totalisers set for addition are necessary, these totalisers being represented diagrammatically in Fig. 15 and indicated by I, I', and I". Further, a cross totaliser, Q, constructed in the manner above described, is necessary, in which the bail 42, serving as a flap for the inspection aperture, is set by hand in the position shown in Fig. 11, in which the inspection aperture S is covered.

In the column totaliser, I", of which the cam for controlling the type of calculation in the cross totaliser Q, is set for subtraction, the number "350" is first registered in the above described manner, whereby in the cross totaliser Q, which was formerly at zero, the complementary number of "350" viz., 999650 appears, inasmuch as the capacity of the cross totaliser comprises six decimal places. Thereupon, the column totaliser I' of which is cam for the control of the type of calculation in the cross totaliser, is set for addition, is brought into the working position, and the number "700" registered so that the number "350" now stands in the cross totaliser Q. As, however, the inspection aperture S of said cross totaliser, is now covered by the bail 42, if the number on the cross totalizer is to be made visible, the bail 42 must be shifted up into the position according to Fig. 12 whereby the following operations take place.

Figure 17:
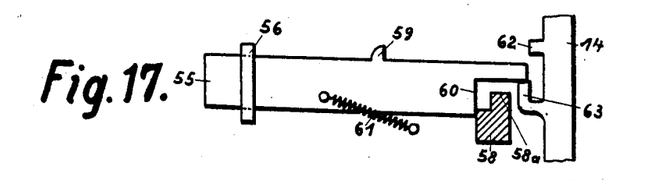

In the swinging movement of the bail 42 in the direction of the arrow h (Fig. 11) the teeth of the limb 42a of the bail 42, act on the teeth of the toothed segment 44, so that the latter is displaced in the direction of the arrow d. The lower teeth 44a of the toothed segment 44 act on the teeth of the toothed segment 46, so that the latter swings round the shaft 47, in the direction of the arrow n. The pawl 51 mounted by means of the screw 52 on the toothed segment 46, acts then on the stop of the cam 50, which is rigidly mounted on the rotatably mounted shaft 47, so that the shaft 47 is likewise rotated in the direction of the arrow n. This rotation is followed by that of the three-toothed wheel 48 fixed on the shaft 47. The toothed wheel 48 acts now with its tooth on the toothed wheel 49, and rotates the latter for one tooth in the direction of the arrow r, whereby the number wheel of the unit place is further rotated for one unit in the additive sense so that now according to the above example the number "351" is visible in the inspection aperture S. The pawl 53, in the rotation of the cam 50, moves into engagement with the next following stop of the same and, therefore, prevents the cam 50 making a rotation in the direction opposite to the arrow n. From the swinging movement of the toothed segment 44, also follows that of the pawl 64, rotatably mounted on it by means of the screw 65. This acts on the nose 59 of the slide 55, and displaces the latter against the action of its spring 61, also in the direction opposite to the arrow b. The pawl 64 then snaps over the nose 59 of the slide 55 and takes up the position represented in Fig. 12. In consequence of the arrangement of the spring 61, the slide 55 is simultaneously pulled downwardly so that the stop 60 rests with its edge on the angle piece 58, according to Fig. 12 or 17, whereby the forward end of the slide 55 is brought out of the path of the nose 62 of the clear sign bridge 14, but remains, however, in the path of the nose 63 and rests on this as shown in Fig. 17. The clear sign bridge 14 can also now travel downwards unhindered.

In order to bring the cross totaliser to zero, the amount "351" is registered in the column totaliser 1, of which the cam for controlling the type of calculation in the cross totaliser Q, is set for subtraction, by striking the corresponding calculating keys.

Figure 18:
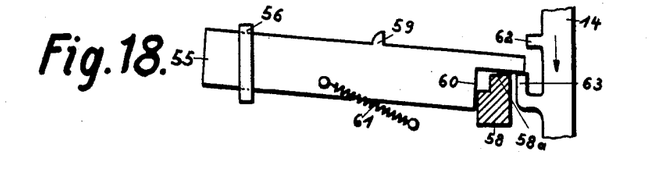

If the last figure is visible in the column totaliser 1, the nose 1a (Fig. 13) of the same has so acted on the nose 2 of the bar 3 that the bar 3 is displaced in the direction of the arrow c, and therefore the angle member 38, fixed to it is placed in the locking position. Moreover, the lever 4, jointed to the bar 3, is swung around its swinging axis 5, against the action of its spring 6, in the anti-clockwise direction, whereby its stop 4b is disengaged from the lever 10. Further, the lever 10 rests with its flat side on the edge 4a of the lever 4, and swings round the shaft 11 in the clockwise direction under the action of the spring before mentioned, acting on the feeler rake 21. As now the cross totaliser Q stands at zero and the slide 55 is set according to Fig. 12 or 17, the feeler rake 21, as previously mentioned, may swing completely in the direction of the arrow r, whereby the clear sign bridge 14 likewise travels completely downward according to Fig. 18 and the slide 55 also takes up the position according to Fig. 18, under the action of its spring 61. Consequently, the clear sign is automatically printed as an indication that the amount has been correctly written out of the cross totaliser Q.

On the printing of the clear sign, the lever 10 is swung automatically in the anti-clockwise direction. Consequently, the lever 4, with its stop 4b under the action of the spring 6, again snaps over the lever 10, whereby the bar 3, which meanwhile is freed by the nose 1a of the column totaliser 1, is displaced in the direction opposite to the arrow c, and the angle member 38, fixed to the bar 3, is also displaced from its locking position with respect to the lever 32.

In the swinging movement of the lever 10 round the shaft 11, in the anti-clockwise direction, the U-rail 13 is also swung, whereby the clear sign bridge 14 has moved upwards and the parts connected with it are again brought into their positions of rest.

In the movement of the clear sign bridge 14 upwards, the nose 63 thereof engages and lifts the front end of the slide 55, and under the simultaneous pull of the spring 61, said slide 55 is moved forwards in the direction of the arrow b, and returned into its rest position represented in Figs. 11 and 16, in which it again rests under the nose 62 of the clear sign bridge 14. Further, if the nose 63 is not so long that in and by itself it may lift the slide 55 upwardly completely free from the stop 58, the impact which the nose 63 exerts on the forward end of the slide 55 is sufficient to move said slide out of the position represented in Fig. 17 and into the position represented in Fig. 16.

The bail 42, in preparation for a new calculation, is swung back again into the position represented in Fig. 11 in order that it may be positioned in readiness for a new working stroke.

By means of this rotational movement, the toothed segment 44 is also swung in the direction opposite to the arrow d, whereby the pawl 64, loosely mounted on it, in consequence of its spring 66, can slide inoperatively over the nose 59 of the slide 55, and then by means of its spring 66, the pawl is again drawn against the fixed stop 67. Moreover, the toothed segment 46 is swung round the shaft 47 in the direction opposite to the arrow n into its rest position whereby the pawl 51, attached to it, moves in ratchet fashion over the next tooth of the cam 50 and places itself according to Fig. 11 behind the same for a new working stroke. In the ratchet movement of the pawl 51, over the teeth of the cam 50, the same is held by means of the pawl 53.

If the typist, however, before the commencement of a new calculation, forgets to swing the bail 42 out of the position represented in Fig. 12 into the position represented in Fig. 11, after the execution of the calculation, as may occur by some incidental distraction, he could be under the impression that he had already operated the bail 42 for the purpose of bringing in the "1" which is lacking, and would, while under this impression, write the corresponding wrong amount out of the cross totalizer Q.

In order to compel him to swing the bail 42, the slide 55 is provided.

It is assumed that the typist, before the commencement of the new calculation, had forgotten to swing the bail 42 into the position according to Fig. 11, the slide 55 remains in its position as represented in Fig. 11, as it had been previously brought into this position by the nose 63 of the clear sign bridge 14. All the remaining parts, however, are in the position according to Fig. 12.

If he now types the amount, too small by "1" of that present in the cross totalizer Q, while under the impression that he had swung out the bail 42, for the purpose of bringing in the "1", the cross totalizer Q returns naturally to zero. The clear sign cannot, however, be printed, as the clear bridge 14 in consequence of the contact of its nose 62 (Fig. 16) with the slide 55 cannot completely move downward. It can then only move downward to the extent of the amount $x$, which suffices to swing the lever 10 by means of the roller 13a and the rail 13 to such an extent that the edge 4a of the lever 4 can rest against the lever 10. As, in the omission of the clear sign impression, as mentioned at the beginning, the lever 10 remains in its outswung position in the clockwise direction, so that the lever 4 is held swung in the anti-clockwise direction, whereby the angle member 38 on the lever 3 takes up its locking position in relation to the lever 32 and consequently all the differential members 22 are held locked so that a further calculation is impossible.

The typist may perceive the mistake by the hanging-up of the clear sign impression bridge, and if he overlooks this, by the locking of the differential members.

For the purpose of removing the error, he raises the rail 13 so that the lever 4, with its stop 4b, can again engage with the lever 10, and the angle member 38 gives up its locking position. He now moves the bail 42 out of the position represented in Fig. 12 and into the position represented in Fig. 11, and brings it immediately back again into the position according to Fig. 12 in order to bring the "1" which is lacking into the cross totalizer by means of the last swinging movement, and thus to set the slide 55 according to Fig. 12 or 17.

After he has brought the paper carriage back so far in the direction opposite to the arrow $c$ that the cross totalizer Q can be again carried along by the column totalizer 1 in the direction of the arrow $c$, he displaces the paper carriage so far in the direction of the arrow $c$, preferably by means of the known space bar, until the units position $Ev$ of the column totalizer 1 and therefore also the units position $Eq$ of the cross totalizer Q, stand in the working position.

After he has shifted the paper round through a line space, he strikes the calculating key corresponding to the value "1" whereby the cross totalizer comes to zero, and the "1" which is lacking is registered in the column totalizer 1, and printed on the paper with the clear sign after it. This shows then that the "1" provided with the clear sign is to be added to the number in the preceding line which is not provided with the clear sign.

Figure 19:
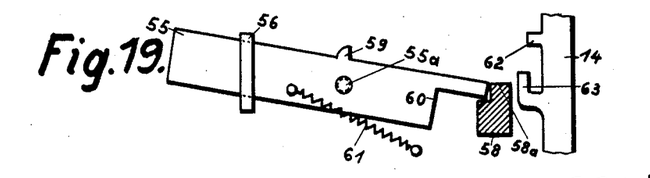

In order that the cross totalizer Q may be applied in the usual manner without the inspection aperture S being covered by the bail 42 (in which case, as has been shown, the clear sign would not be printed and the machine will be locked) it is only necessary to bring the slide 55, by means of the finger knob 55a provided on it into the position represented in Fig. 19, in which position it does not lie in the path of the noses 62 and 63 of the clear sign bridge 14, and further, its nose 59, is not acted on by the pawl 64. In consequence of this, the clear sign printing device can operate in each case in which the cross totalizer Q comes to zero, while the device, in so far as the slide 55, according to Fig. 16, is in the working position, only then operates, if the cross totalizer comes to zero, and the bridge 42 has been correctly actuated.

Although the arrangement is described for the bringing in of the value "1", naturally the arrangement through corresponding changes of the cam 50 and of the wheel 48, may also be constructed so that any desired unit may be brought in, without departing from the spirit of the invention.

Figure 20:
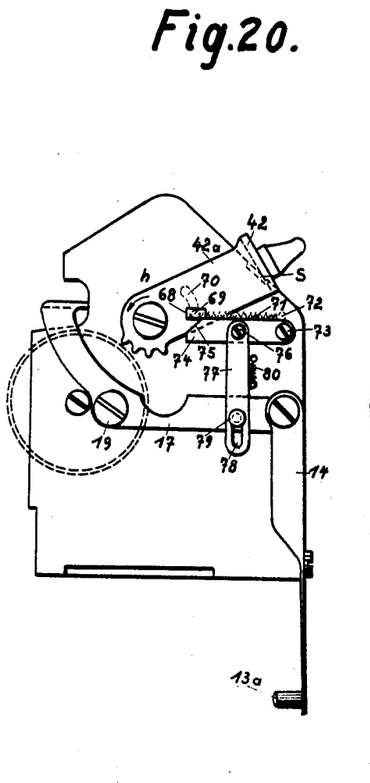
Figs. 20 and 21, shows a modified arrangement according to the invention.
Figure 21:
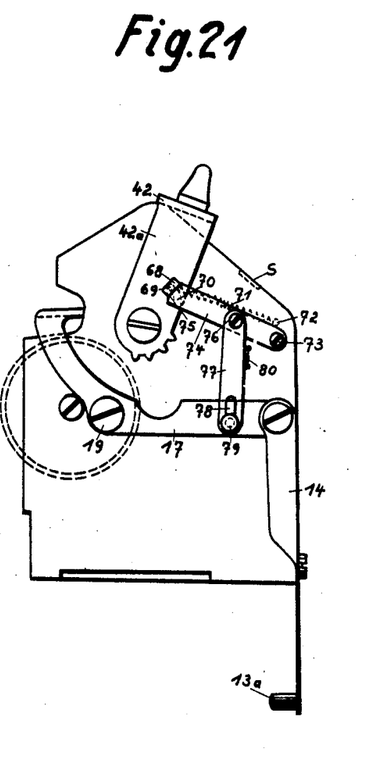

In the modified form of construction in Figs. 20 and 21, on the limb 42a of the bail 42, a small projection 68 is arranged, of which the pin 69 projects through the slot 70 of the cross totaliser side wall. On the end of the pin 69, is fixed a spring 71, which at its other end is connected to a pin 72, and acts on the bail 42, always in the clockwise direction. On a screw 73, a lever 74 is swingably mounted, which lever with its incline 75 can act on the projection 68. By means of the screw 76 on the lever 74, a downwardly projecting lever 77 is swingably arranged, through the elongated hole 78, of which projects a headed pin 79, fixed to the lever 17 of the clear sign bridge 14. A spring 80, arranged on the lever 77 and on the side wall of the cross totaliser, always pulls upwardly on the lever 77.

If now the bail 42 is swung in the direction of the arrow $h$, the lever 77 travels upwards under the pull of the spring 80, and acts on the lever 74, swinging the same around the screw 73 in the clockwise direction and with its incline 75, according to Fig. 21, rests on the edge of the projection 68, whereby the bail 42 is held in its position as represented in Fig. 21.

If the clear sign is now printed, the arm 17 swings around the screw 19 in the clockwise direction. Consequently, the pin 79 takes the lever 77 downwardly along with it and accordingly the lever 74 swings around the screw 73 in the anti-clockwise direction and takes up the position represented in Fig. 20. The bail 42, can now follow the pull of the spring 71, and swings in the opposite direction to the arrow $h$, so that it likewise assumes the position represented in Fig. 20. The projection 68 then rests with its edge on the upper edge of the lever 74 and the lever 77, along with the lever 74, are thus prevented from following the pull of the spring 80.

By means of this arrangement, the downward movement of the bail 42 is automatically attained while the parts 55, 58 and 62, 63, and also the pawl 42f, are not required.

I claim:

1. In a combined typewriting and computing machine, the combination with an accumulator having a sight opening therein and denominational value wheels movable step by step and visible through said opening, of a shutter for blinding said opening and movable in opposite directions into and from blinding position, respectively, a drive between said shutter and one of said wheels operative by movement of said shutter in one direction to impart a step of rotation to said wheel, and clear sign printing mechanism automatically operative under the conjoint control of said wheels and shutter.

2. In a combined typewriting and calculating machine, the combination with an accumulator having a sight opening and value wheels therein, of a shutter for uncovering and covering said opening, clear sign printing mechanism, automatically operative, and means to control operation of said sign printing mechanism including a locking member moved to unlocking position by operation of said shutter and restored to locking position by operation of said sign printing mechanism.

3. In a combined typewriting and calculating machine, the combination with an accumulator having a sight opening and value wheels therein, of a shutter for blinding said opening movable into and from blinding position, clear sign printing mechanism automatically operative, and means to control operation of said sign printing mechanism including a locking member movable to unlocking position by movement of said shutter from blinding position and restored to locking position by operation of said sign printing mechanism.

4. In a combined typewriting and computing machine, the combination with an accumulator including a casing having a sight opening and value wheels therein, and accumulator operating means including differential actuators, of a bail-like shutter for uncovering and covering said opening, means controlled by said actuators, a locking mechanism for said value wheels operative by said means controlled by said actuators to unlocking position, means for blocking operation of said mechanism, and clear sign printing mechanism operative under the conjoint control of said shutter and said value wheels and controlling operation of said blocking means.

5. In a combined typewriting and calculating machine the combination with an accumulator casing having a sight opening and value wheels therein, a bail flap for uncovering and covering said opening, clear sign printing mechanism including means to control said sign printing mechanism in dependence of the position of the value wheels and operation of said bail flap and a locking member normally locking said mechanism and operative to unlocking position by operation of said bail flap and locking and unlocking mechanism for the value wheels blockable in the locking position under control of said clear sign printing mechanism.

ROBERT ANSCHÜTZ.